United States Patent
Varga et al.

(10) Patent No.: US 11,074,005 B1
(45) Date of Patent: Jul. 27, 2021

(54) COORDINATED STORAGE MEDIA VERIFICATION

(71) Applicant: INTERNATIONAL BUSINESS MACHINES CORPORATION, Armonk, NY (US)

(72) Inventors: Sergio Varga, Campinas (BR); Douglas Luiz Mendes Baiense, Belo Horizonte (BR); Daniela Trevisan, Porto Alegre (BR); Andre Luiz Coelho Silva, Rio de Janeiro (BR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 19 days.

(21) Appl. No.: 16/733,409

(22) Filed: Jan. 3, 2020

(51) Int. Cl.
*G06F 3/06* (2006.01)

(52) U.S. Cl.
CPC .......... *G06F 3/0653* (2013.01); *G06F 3/0619* (2013.01); *G06F 3/0682* (2013.01)

(58) Field of Classification Search
CPC ..... G06F 3/0653; G06F 3/0682; G06F 3/0619
See application file for complete search history.

(56) References Cited

U.S. PATENT DOCUMENTS

| | | | |
|---|---|---|---|
| 3,510,857 A | 5/1970 | Kennedy et al. | |
| 3,731,289 A | 5/1973 | Bajgert | |
| 4,980,878 A | 12/1990 | Szerlip | |
| 5,809,511 A | 9/1998 | Peake | |
| 6,557,141 B1 | 4/2003 | Gill et al. | |
| 7,809,990 B2 | 10/2010 | Sasaki | |
| 7,864,478 B2 | 1/2011 | Anna et al. | |
| 8,527,561 B1* | 9/2013 | Moody, II | G06F 3/0686 707/822 |
| 2006/0126211 A1 | 6/2006 | Sasaki | |
| 2017/0169843 A1 | 6/2017 | Ahmad et al. | |
| 2018/0088836 A1* | 3/2018 | Freitag | G06F 3/0653 |
| 2020/0004623 A1* | 1/2020 | Borlick | G06F 11/1096 |

OTHER PUBLICATIONS

Aine, H., et al., "SMPTE Conference—The Importance of Media Verification for Effective Content Management Workflow", SMPTE, Oct. 27-29, 2009, 2 pgs.
Mell, Peter, et al., "The NIST Definition of Cloud Computing", NIST Special Publication 800-145, Sep. 2011, Gaithersburg, MD, 7 pgs.

* cited by examiner

*Primary Examiner* — Hiep T Nguyen
(74) *Attorney, Agent, or Firm* — Maeve Carpenter; Matthew M. Hulihan; Heslin Rothenberg Farley & Mesiti PC

(57) ABSTRACT

Coordinated storage media verification is provided by checking usage of a plurality of storage media, maintaining a storage media check database indicating media verification to be performed for one or more of the plurality of storage media, where the maintaining includes determining and comparing a time since a last load of a selected storage medium to a verification frequency threshold and determining whether media verification of the selected storage medium is to be performed, coordinating media verification of at least one storage medium of the plurality of storage media based on the storage media check database, which coordinating includes selecting at least one storage medium to be verified in an ascertained window of time, and initiating media verification of the selected at least one storage medium.

20 Claims, 13 Drawing Sheets

COORDINATED STORAGE MEDIA VERIFICATION

BACKGROUND

An approach used by many companies to save data for backup or security reasons is to use magnetic tapes/cartridges in tape libraries. Tapes provide a level of storage capacity, portability because of their size, and durability that is acceptable to many. Moreover, electricity is not needed to retain the stored data after it is written to the tapes.

Although a tape is a relatively reliable storage medium, it is good-practice to subject the tape to media verification, sometimes termed 'automatic media verification'. This refers generally to a check of the expected performance, readability, integrity, etc. of the storage medium and data thereon.

SUMMARY

Shortcomings of the prior art are overcome and additional advantages are provided through the provision of a computer-implemented method. The method checks usage of storage media of a computing environment. The method also maintains a storage media check database indicating media verification to be performed for one or more storage media of the storage media. The maintaining includes determining a time since a last load of a selected storage medium of the storage media, comparing the time since the last load of the selected storage medium to a verification frequency threshold, and determining, based on the comparing, whether media verification of the selected storage medium is to be performed. The method also coordinates media verification of at least one storage medium of the storage media based on the storage media check database. The coordinating the media verification includes accessing the storage media check database and identifying that media verification of the one or more storage media is indicated to be performed, and, based on an ascertained window of time available for media verification, selecting at least one storage medium of the one or more storage media. The method further includes initiating media verification of the selected at least one storage medium.

Further, a computer system is provided that includes a memory and a processor in communication with the memory, wherein the computer system is configured to perform a method. The method checks usage of storage media of a computing environment. The method also maintains a storage media check database indicating media verification to be performed for one or more storage media of the storage media. The maintaining includes determining a time since a last load of a selected storage medium of the storage media, comparing the time since the last load of the selected storage medium to a verification frequency threshold, and determining, based on the comparing, whether media verification of the selected storage medium is to be performed. The method also coordinates media verification of at least one storage medium of the storage media based on the storage media check database. The coordinating the media verification includes accessing the storage media check database and identifying that media verification of the one or more storage media is indicated to be performed, and, based on an ascertained window of time available for media verification, selecting at least one storage medium of the one or more storage media. The method further includes initiating media verification of the selected at least one storage medium.

Yet further, a computer program product including a computer readable storage medium readable by a processing circuit and storing instructions for execution by the processing circuit is provided for performing a method. The method checks usage of storage media of a computing environment. The method also maintains a storage media check database indicating media verification to be performed for one or more storage media of the storage media. The maintaining includes determining a time since a last load of a selected storage medium of the storage media, comparing the time since the last load of the selected storage medium to a verification frequency threshold, and determining, based on the comparing, whether media verification of the selected storage medium is to be performed. The method also coordinates media verification of at least one storage medium of the storage media based on the storage media check database. The coordinating the media verification includes accessing the storage media check database and identifying that media verification of the one or more storage media is indicated to be performed, and, based on an ascertained window of time available for media verification, selecting at least one storage medium of the one or more storage media. The method further includes initiating media verification of the selected at least one storage medium.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
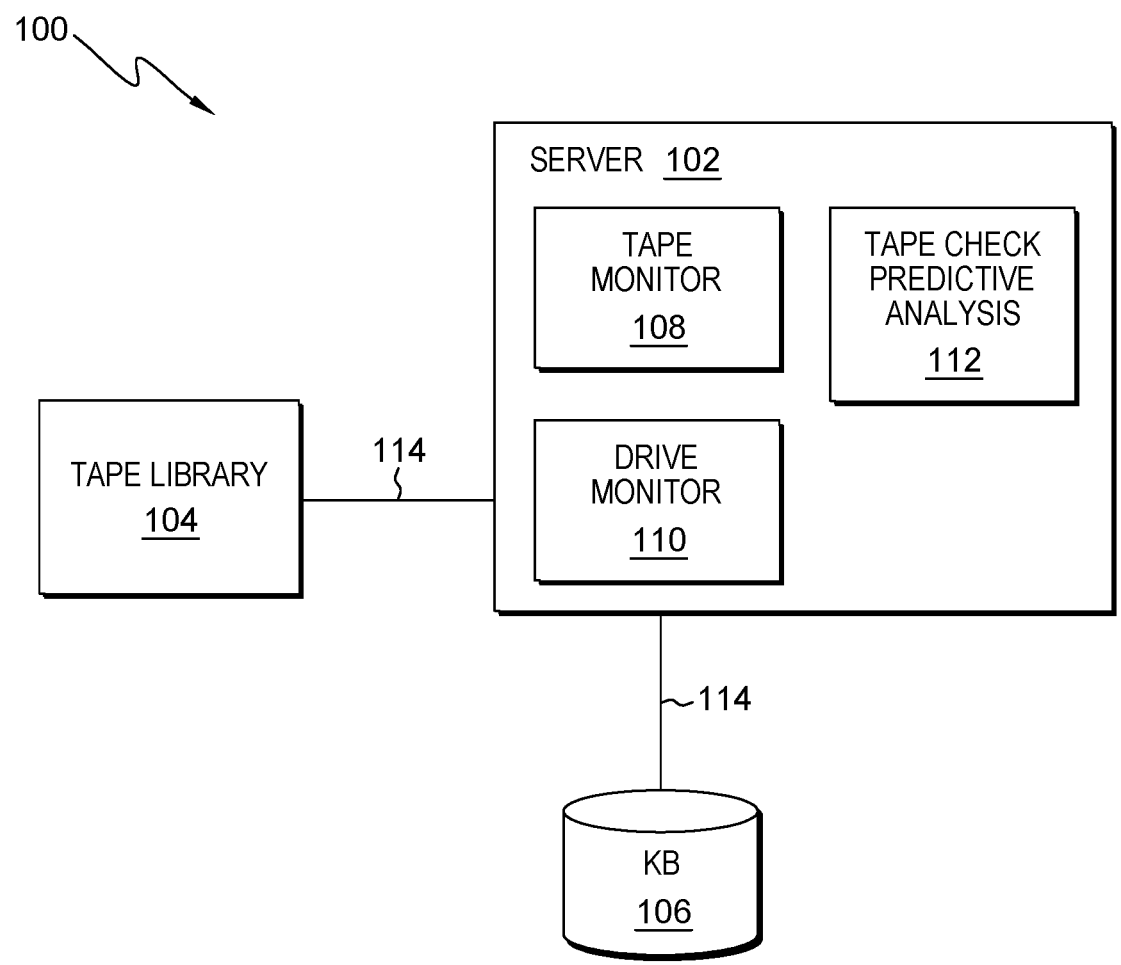
FIG. 1 depicts an environment to incorporate and use aspects described herein.

Verification of storage media can be important to ensuring effectiveness of the data storage approach taken. Storage and manipulation of magnetic tapes outside of the tape library can expose them to damaging dirt, fingerprints, airborne pollutants, and other debris. Keeping tapes in the same position (e.g. lying flat) for a prolonged period of time can also cause problems. For long-term tape storage and/or if a tape is to remain unmounted from the tape library, it can be helpful to load and utilize (e.g. rewind, seek, etc.) the tape every so often in order to mechanically work the tape and cartridge in the hopes of identifying early warnings of a problem. After a period of inactivity of three years, for instance, the tape may have degraded to the point where some or all data that was stored thereon is unrecoverable.

A tape library might provide an option for tape media verification that follows a schedule set by a tape library administrator or other user. The schedule can be based on a start date and frequency, and select one of the drives to perform the verification, for instance. Following such an approach, on the initial set up, all available tapes on the tape library become a candidate to be verified. Depending on the number of tapes and how full they are, it could take a very long time to perform media verification of all of the tapes. This can lead to the administrator or other user disabling the verification option altogether, despite the potential for the cost to attempt data recovery on a failed tape to be extremely expensive and without any guarantee that the attempt will succeed.

Current approaches fail to provide coordinated and organized media verification for a collection of storage media. Described herein are approaches for coordinated media verification. Although examples are described herein with reference to the magnetic tape form of storage medium, in which media verification thereof includes verifying integrity of the tape and readability of data stored thereon, aspects described herein apply to any desired type of storage media, for instance any type of storage media that may be susceptible to deterioration and/or damage over time.

In accordance with aspects described herein, optimizations are provided for how and which storage media are selected for verification. Specifically, in some aspects, media is marked for verification based on meeting certain criteria of inactivity. This can avoid unnecessary verification and lengthy media verification queues that are commonplace for an uncoordinated, conventional verification schedule. Aspects provide a smart media verification approach based on a predictive method and that leverages machine resources at opportune times to perform verification of selected media.

Among some benefits provided by aspects described herein are:
  Increase in tape life, as periodic checking can identify and/or forecast future problems and proactively address them if possible;
  Resource savings, avoiding spending of money for tape content recovery due to unrecognized physical malfunctioning;
  Avoiding system outages or downtime due to delays in obtaining data from a damaged tape; and
  Intelligent media verification scheduling to consume machine resources necessary to perform the verifications during convenient times. Verification can be scheduled during an optimal timeframe determined based on machine statistics of drive utilization, for instance.

In some embodiments, a settings or other administration panel or equivalent is enhanced to enable a tape library administrator or other user to specify parameters for coordinated verification, for instance a verification frequency threshold and/or percentage value thereof for guiding coordinated media verification, as described in further detail herein.

A first example approach considers the latest (i.e. most recent) load/mount date of the tapes. If some amount of time specified by the library administrator has lapsed since this last load date of a tape—an amount of 'inactive' time passes—the tape could be selected to be verified. The specified amount of time is referred to herein as a verification frequency threshold. It can be any length of time expressed in days, months, years, or any other unit. Alternatively, the verification frequency threshold could be expressed as any other characteristic for which the characteristic's magnitude is related to passage of time. Examples of such other characteristics include, but are not limited to, an amount of data read and/or written to the tape, or a number of accesses (read/write seeks) performed against the tape.

In a second example approach, if a tape is loaded before, but sufficiently close to, reaching the verification date as determined by the first approach above, which considers the inactive time, then the tape can be selected for verification nonetheless. Under this example approach, if the amount of inactive time of a loaded tape (i.e. the time between the current load and the immediately prior load) exceeds some percentage of the verification frequency threshold defined by the library administrator above, the tape could be selected to be verified, for instance as soon as an optimum verification time window becomes available. This is despite the tape having been loaded prior to lapse of the verification frequency threshold.

FIG. 1 depicts an environment to incorporate and use aspects described herein. Environment 100 includes a server 102, tape library 104 and knowledgebase 106 in communication with each other over communication links 114. Communications links are for communicating data between components. In some examples, links 114 could form, be, or include wired or wireless network(s), such that the communication between the components takes place via wired or wireless communication(s) links for communicating data between the components. Such network(s) can include any one or more networks, such as one or more local area networks and/or one or more wide area networks, such as the internet. Communication links 114 can be any wired or wireless communications link, such as wired and/or cellular, Wi-Fi, or other types of wireless connections.

Server 102 is implemented by one or more computer system(s), and includes tape monitor 108, drive monitor 110, and tape check predictive analysis 112 components for performing aspects described herein. Tape library 104 may alternatively be referred to as a tape silo, robot or jukebox, a known component, containing tape drives and receptacles for tape cartridges housing magnetic tape storage media. Tapes are mounted (loaded) and accessed, then unmounted (unloaded) and stored/archived. Tape monitor 108 can monitor the loading (and optionally unloading) of tapes in the tape library, which enables a determination as to how much time has passed since/between tape loads. Tape monitor can also determine tapes for verification, for instance using the indication of last load date, current date, and the verification frequency threshold set by a library administrator as described herein.

Knowledgebase 106 is a database referred to herein as a storage media check database. The storage media check database can indicate, among other information, which storage media (tapes in this example) are to be verified. Under the coordinated storage media verification described herein, various storage media may be marked for verification at different times. The storage media check database can also hold parameter(s) for the coordinated media verification.

One such parameter is the verification frequency threshold set by an administrator. The server 102, leveraging component(s) thereof, such as tape monitor 108, can maintain the storage media check database 106 by, in part, comparing last load date of media to the verification frequency threshold and determine, based on that comparison, whether verification is to be performed on that media.

According to some aspects, coordinated selection of tapes to be verified and the best windows of time for this verification is provided. Tape check predictive analysis 112 provides a predictive method that determines an opportune (e.g. optimal) window of time in which to perform verification of one or more tapes that are indicated, in the storage media check database 106, to be verified. The predictive method can leverage statistics of tape drive utilization (acquired via the drive monitor 110 and optionally stored in KB 106) to identify windows of time during which tape drive utilization is otherwise relatively low. In this manner, media verification can be performed at times when it is least likely to negatively impact the regular workload of the derives. This can inform not only when to perform verification, but also a duration of the window of time, e.g. until drive utilization is expected to increase. From that information, the number of tapes to verify during that window can be determined. This can be based, as one example, on average time to perform tape verification.

Figure 2:
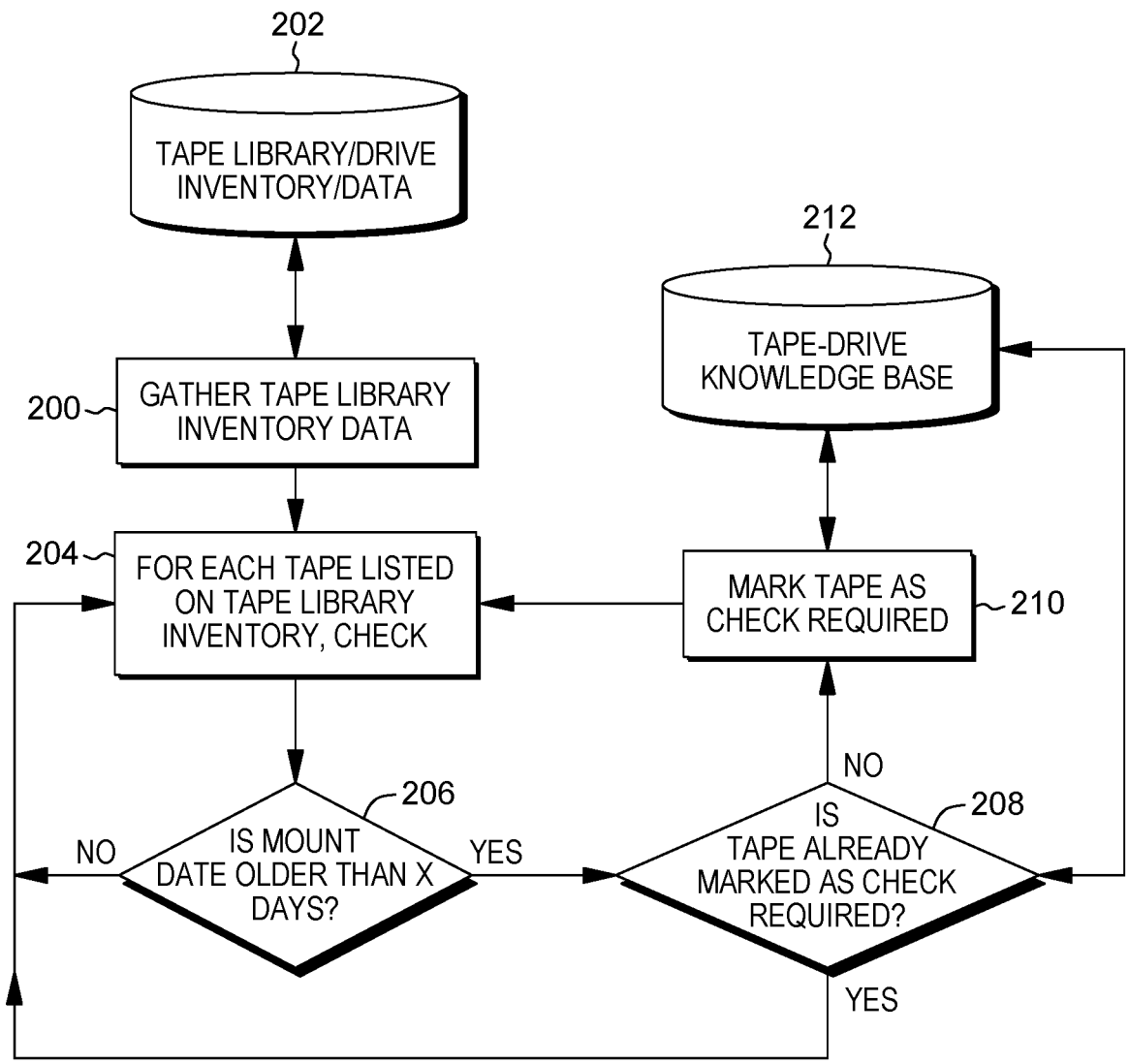
FIGS. 2 and 3 depict example processes for identifying media for media verification, in accordance with aspects described herein.
Figure 3:
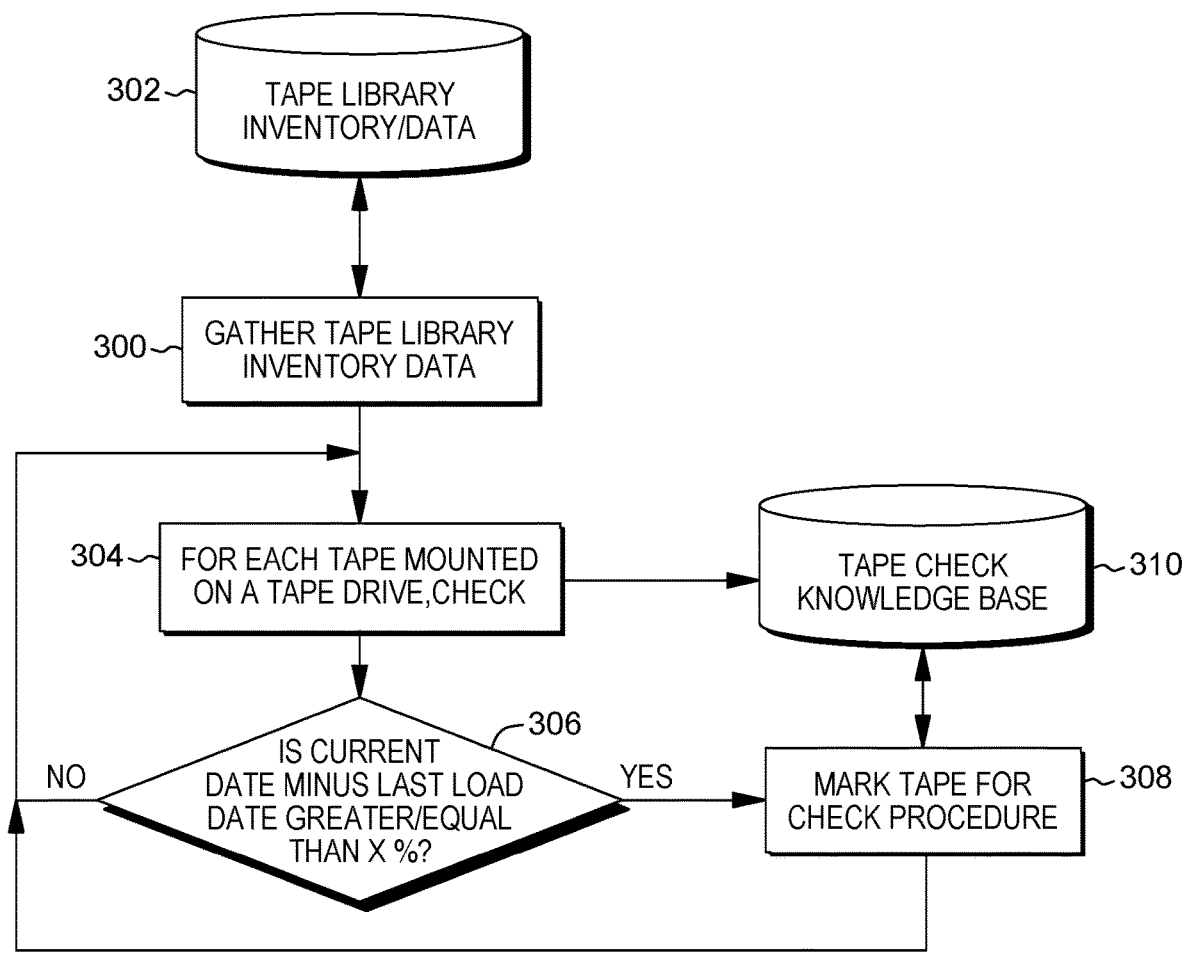

FIGS. 2 and 3 depict example processes for identifying media for media verification, in accordance with aspects described herein. In some examples, the processes are performed by server 102 as part of maintaining the storage media check database 106.

FIG. 2 depicts a first example that follows the first approach mentioned previously. In this approach, a tape is marked for a verification check based on lapse of a specified threshold amount of time (verification frequency threshold) since last loading the tape. At 200, the process gathers tape library inventory data. This may be done by accessing and reading-out tape library drive inventory data 202, for instance from the tape library. The information is optionally stored by/in the tape monitor. The inventory can indicate any tape associated with the library, regardless of whether the tape is currently mounted. The gathering of this information also checks usage of the tapes, referring to checking for load/mount events and times thereof, data accesses and times thereof, and any other desired information about utilization. Then, at 204, for each tape listed on the tape library inventory, various check(s) are initiated. Initially, for a selected tape, the process can determine a time since a last load of the tape. At 206, the process determines whether this last load/mount date is older than X number of days (the preset verification frequency threshold in this example). Specifically, the process can check whether the current date minus the last load date is greater than or equal to the preset threshold. In this manner, a comparison is made of the time since the last load of the selected tape to the verification frequency threshold. Based on this comparison, a determination is made as to whether media verification of the selected tape is to be performed. If the comparison indicates that the time since the last load of the selected tape (i.e. current date minus last load data) exceeds the verification frequency threshold, the system maintains the storage media check database by indicating therein that media verification of the selected tape is to be performed. Otherwise, the process moves onto the next tape to process. Thus, if at 206 it is determined that the last mount date occurred not more than X days ago (206, N), the process continues to 204 to select the next tape in the library. Otherwise, the process determines that the last mount date is older than the threshold (206, Y) and, in this example, proceeds to a determination (208) of whether the tape is already marked as 'check required', i.e. already indicated for verification in the storage media check database. Because the processing of FIG. 2 can be performed continuously or periodically, a previous run may have marked the tape for verification and the current run may be executing before verification of the tape so-marked has been performed.

If at 208 it is determined that the tape is already marked as 'check required' (208, Y), the process proceeds back to 204 to select the next tape in the library. Otherwise (208, N), at 210 the process marks the tape as 'check required', i.e. by indicating this in the storage media check database (tape-drive knowledgebase 212) and proceeds to 204.

FIG. 3 depicts a second example that follows the second approach mentioned previously. In this approach, a tape that is currently loaded is marked for a verification check on the basis that a verification check would have relatively soon been indicated by the process of FIG. 2 but-for the current load of the tape. As a basic example, if the verification frequency threshold is 180 days and a tape is loaded after having remained unloaded for 179 days, then it may be desired to verify the tape even though the threshold of 180 has not yet lapsed. This avoids a situation where a very infrequently used tape escapes verification under the process of FIG. 2 simply because of intermittent loads that happen to occur less than 180 days apart each time. The timeframe for how close to the threshold amount of time is deemed sufficient to warrant verification under this approach is defined by a percentage of the verification frequency threshold (a percentage of 180 days in this example). In situations where a tape is used relatively frequently (frequency less than the time defined by the percentage of the threshold), say every 10 days, then verification may not be necessary because any problem is likely to identified relatively quickly given the frequency of use of the tape.

At 300, the process gathers tape library inventory data. Similar to this aspect of FIG. 2, this can be done by accessing and reading-out tape library drive inventory data 302, for instance from the tape library. At 304, for each tape that is loaded on the tape drive, a respective check is initiated. For a next loaded tape, the process determines at 306 whether the time since the prior load of the tape equals or exceeds a percentage (X %) of the verification frequency threshold. The time since the prior load of the tape can be determined by subtracting the last load date (i.e. the load prior to the current load of the tape) from the current date. If that amount of time is less than some defined amount of time, in this example specified as a percentage of the verification frequency threshold, then inquiry 306 is answered in the negative (306, N) and the process returns to 304 to select a next loaded tape to process. Otherwise, the time since the prior load is equal to or greater than the percentage of the threshold (306, Y). Based on the this, the process marks (308) the tape for verification, i.e. by indicating in the storage media check database (tape-check knowledgebase 310) that media verification of the storage medium is to be performed, and proceeds to 304.

In some examples, processing of FIG. 3, for instance aspects 306, 308 and 310, are performed for a given tape based on and triggered by physically loading the tape for reading. Further, the processing can be performed when this load occurs before the verification frequency threshold amount of time has passed since an immediately-prior load of the tape. In this manner, processing of FIG. 3 could be triggered for a given tape based on loading the tape.

Figure 4:
FIG. 4 depicts an example timeline of events related to media verification in accordance with aspects described herein.

FIG. 4 depicts an example timeline of events related to media verification in accordance with aspects described herein. FIG. 4 provides a specific example of the tape monitoring of FIGS. 2 and 3.

Referring to FIG. 4, a timeline is presented showing the timing of various events. Assume for this example that the verification frequency threshold is 180 days, meaning that if a tape has not been loaded for more than 180 days, it should be marked for verification. Initially, a tape is loaded on Day 0, accessed, and unloaded. In a first scenario, assume that the tape is not loaded before day 181. Then on day 181, the processing of FIG. 2 would mark the tape for verification.

In a second scenario, assume instead the tape is initially loaded on Day 0, accessed, unmounted, and then loaded again on Day 10, accessed, and unmounted. If the load on Day 10 is the last/latest load of the tape, then if the process of FIG. 2 were run on day 181, the tape would not be marked for verification, as 181−10=171, which does not exceed 180. In other words, 180 days have not yet passed since day 10, the time since last load. Instead, it is not until day 191 that the tape would be indicated for verification.

In a third scenario, the tape is initially loaded on Day 0, then again on Day 10, and again on Day 20. Each of these loads will have the effect of pushing out the earliest day that the tape would be indicated for verification. In this scenario, it is not until day 201 that the tape would be indicated for verification.

The above three scenarios exemplify operation of the verification frequency threshold per the process of FIG. 2. In a fourth scenario to exemplify operation of the process of FIG. 3, assume the same three loads on Days 0, 10, and 20. Assume also that an administrator has set a parameter for the percentage of the threshold to be 90%. 90% of the 180 threshold is 162 days.

Under the process of FIG. 2, there is no marking of the tape for verification until day 201 is reached. However, assume that the tape is loaded next at day 195. This load can initiate the process of FIG. 3, which checks whether the current date (day 195) minus last load date (day 20) is greater than or equal to 162 days (90% of 180). Since 195−20=175 days, which is greater than 162 days, then the process of FIG. 3 executed on day 195 will mark the tape for verification because this current date on Day 195 is sufficiently close (as defined by the percentage parameter) to the would-be verification date of day 201.

It is noted that the processes of FIGS. 2 and 3 are not mutually exclusive and serve to identify different situations to trigger a tape for verification.

Figure 5:
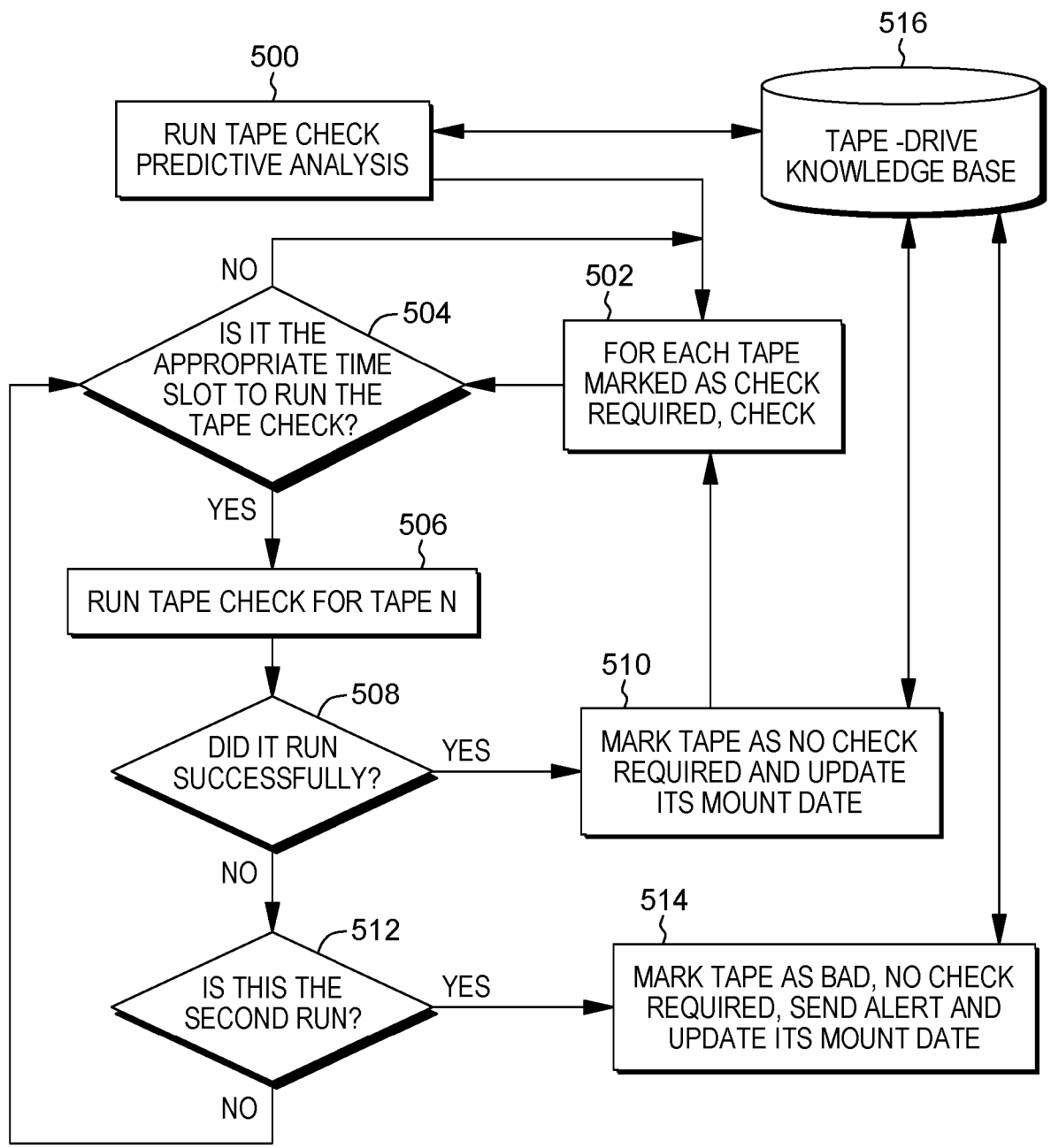
FIG. 5 depicts an example process for coordinating media verification processing, in accordance with aspects described herein.

Additional aspects described herein provide coordination of the media verification of at least one tape of the collection of tapes on the library, and this coordination is based in part on the indications in the storage media check database. The coordination can dictate when verification is to be performed for the tapes to-be-verified. Based on this, a process can initiate media verification of the tapes accordingly. FIG. 5 depicts an example process for coordinating media verification processing, in accordance with aspects described herein.

The process initiates tape check predictive analysis 500 which, based on tape drive utilization, i.e. if tape drive usage is sufficiently low, can read from the storage media check database and select as many tapes as it can verify in a window of time considering the total drives and total time it will take for the verification. The predictive analysis can access the storage media check database and identify that media verification of one or more tapes is indicated to be performed, and ascertain a window of time available for media verification. The window of time can be ascertained based on statistics of drive usage of the tapes. The window of time could be a window that has already opened, or one that is predicted to be available in the future.

Based on the ascertained window of time available for media verification, the process can select at least one tape to be verified. There may be 10 tapes to check but the window might afford enough time to verify only 5 of them. The priority in which to check the tapes marked for verification can be determined using any desired approach. In one example, selection of particular tape(s) for verification during the window is based on a duration of the window of time and estimated time to perform media verification of the tapes.

The process proceeds by entering a loop at 502. For each tape marked for verification, the process determines at 504 whether the current time (or if the ascertained window of time is in the future, then that time in the future) is an appropriate time slot to perform the verification on that tape. If not (504, N), the process returns to 502 to select a next tape marked for verification. Otherwise, the window is the appropriate time to perform the verification of the tape (504, Y), and the process proceeds (assuming the window is open) by running (506) the tape check for this tape. This performs a check of the tape for errors. The process then determines at 508 whether the check was successful, i.e. whether the tape passes the verification check. If so (508, Y), the process at 510 marks the tape as 'no check required' and updates the last load date to the current date in the storage media check database (tape-drive KB 516). The process then proceeds to 502 to process the next tape.

If instead at 508 it is determined that the tape fails the check (508, N), then in this example the process determines at 512 whether this is the second run that failed. In this regard, an administrator may set a threshold number representing a number of consecutive verification checks that a tape is to fail in order to deem the tape bad.

Thus, based on the tape failing the check, the process can determine whether a threshold (i.e. 2 in this example) number of consecutive failed checks of the storage medium has been reached as a result of failing the current check. Based on determining that the threshold number of consecutive failed checks of the storage medium has not been reached (512, N), the process can enqueue the tape for another check for errors. This can place the tape back into the queue/pool of tapes to check again. The process proceeds to 504 where the process checks whether the window can still accommodate that additional verification. If so, the tape can be checked at that point, otherwise the additional verification can be deferred to another time. In either case, the tape is still marked for verification in the storage media check database.

Returning to 512, based on determining that the threshold number of consecutive failed checks of the storage medium has been reached (512, Y), the process indicates that the tape is failed and raises an alert. In FIG. 5, based on the second run failing (512, Y), the process at 514 marks (e.g. in the storage media check database) the tape as bad, updates a check flag or other and indicator to indicate no check is required, sends an alert, and updates the tapes last load date. At that point, the process can proceed back to 502 to process a next tape marked for verification.

After all tapes marked for verification have been processed, the process ends. At that point, any desired action(s) can be performed based on results—one or more alerts can be raised, report(s) can be generated, and/or results can be reported to a software tool, as examples.

Figure 6:
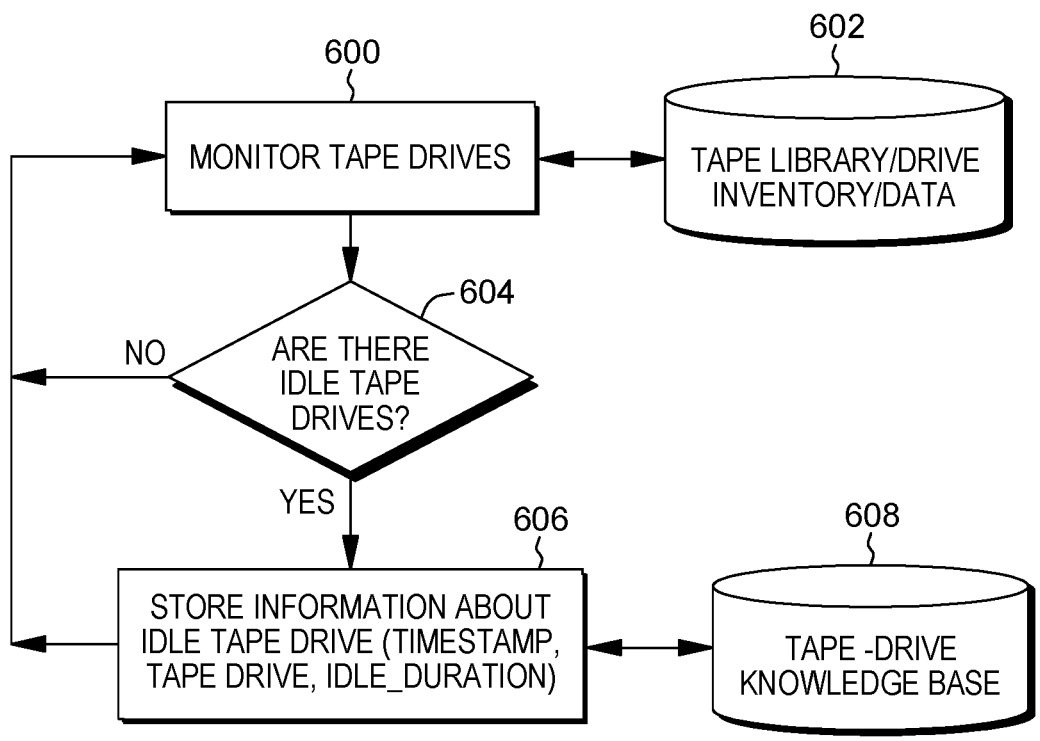
FIG. 6 depicts an example process for monitoring usage of storage media drives, in accordance with aspects described herein.

FIG. 6 depicts an example process for monitoring usage of storage media drives, in accordance with aspects described herein. Monitoring usage of the storage media drives and storage media (e.g. tapes) can inform of the best times (windows) to perform media verification. The process monitors tape drives at 600, for instance by tape library/drive inventory/information 602 from the tape library. On each tape drive request, the monitoring can store a total number of used tape drives, the amount of time each is used, and any hardware error messages. It is determined at 604 whether there are any idle/available tape drives. If there are no idle tape drives (604, N), the process returns to 600 to continue monitoring the tape drives. If instead there are idle/available tape drive(s) (604, Y), information about the idle drive(s) is recorded at 606. Such information can include a timestamp of the current time, identifier(s) of the idle drive(s), and indications of the durations for which such idle drive remains idle, as examples. This information can be recorded in the storage media check database (tape-drive knowledge base 608) and can be used in tape check predictive analysis (112 of FIG. 1, and FIG. 5) for ascertaining a window of time for media verification.

FIGS. 7A-7E depict example processes for facilitating media verification, in accordance with aspects described herein. In some examples, the processes are performed by one or more computer systems, such as those described herein, which may include one or more computer systems/servers in communication with a tape library and/or one or more other computer systems, as examples.

Figure 7A:
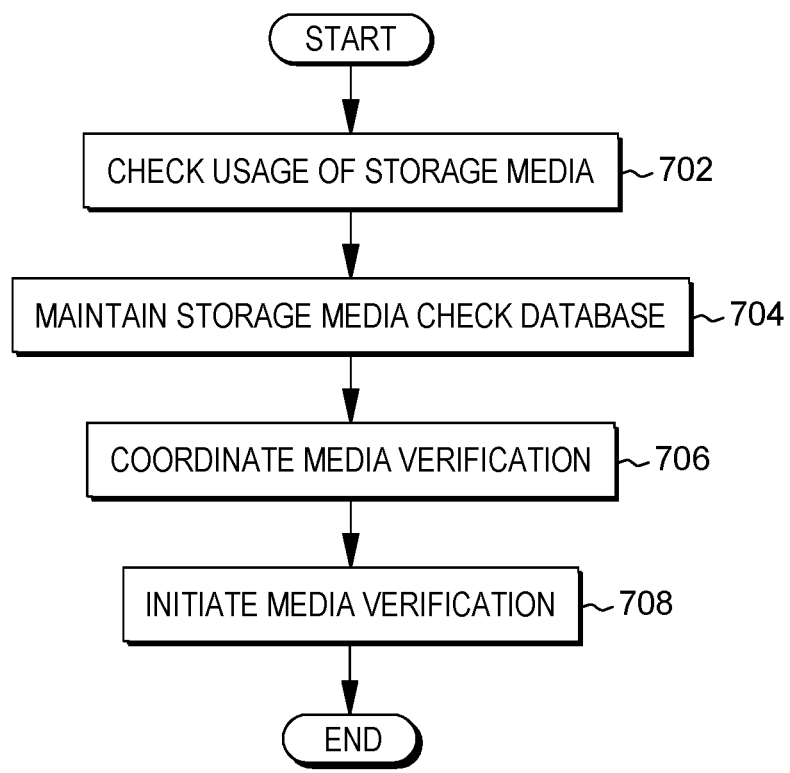
FIGS. 7A-7E depict example processes for facilitating media verification, in accordance with aspects described herein.

FIG. 7A presents an example process for coordinated media verification. The process checks (702) usage of a plurality of storage media of a computing environment. Usage can refer to load/mount events, and optionally information about media accesses, timing of such events, and any other desired information about media usage. The plurality of storage media can be or include magnetic tapes, of which media verification can include verifying integrity of the tape and readability of data stored thereon.

The process proceeds by maintaining a storage media check database, referred to elsewhere herein as a tape drive knowledgebase, that indicates media verification to be performed for one or more storage media of the plurality of storage media. Example aspects for maintaining the storage media check database are presented with reference to FIGS. 7B and 7C.

Continuing with the process of FIG. 7A, the process proceeds by coordinating (706) media verification of at least one storage medium of the plurality of storage media based on the storage media check database. In this regard, it is possible that not every storage medium is indicated for verification at a given time. Example aspects of coordinating the media verification are presented with reference to FIG. 7D.

The process of FIG. 7A concludes by initiating (708) media verification of the selected at least one storage medium, for instance invoking processing to perform the media verification.

Figure 7B:
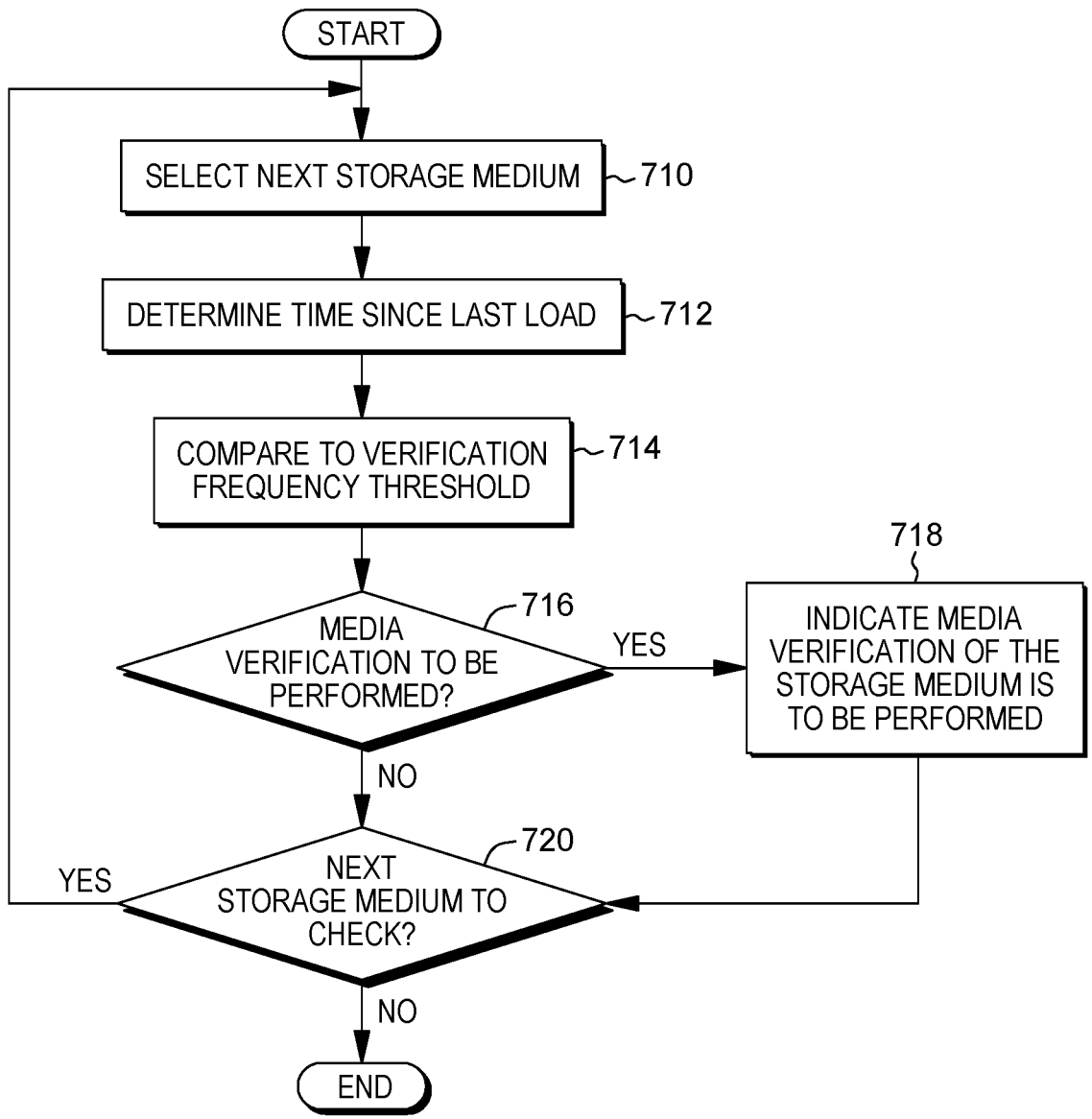

FIG. 7B depicts an example process for maintaining a storage media check database, in accordance with aspects described herein. The process can be performed continuously and/or periodically, for instance one or more times per day, if desired. The process selects (710) a next storage medium of the plurality of storage media and determines (712) a time since a last load of the selected storage medium. The process then compares (714) the time since the last load of the selected storage medium to a verification frequency threshold. The process determines (716), based on the comparing, whether media verification of the selected storage medium is to be performed. Based on the comparing indicating that the time since the last load of the selected storage medium exceeds the verification frequency threshold, the process determines that media verification is to be performed (716, Y) and indicates (718) in the storage media check database that media verification of the selected storage medium is to be performed. Then, or if at 716 it is determined that media verification is not to be performed for this storage medium, the process proceeds by determining (720) whether there is a next storage medium to check for whether to indicate it as needing verification. If so, the process returns to 710, otherwise the process ends.

Figure 7C:
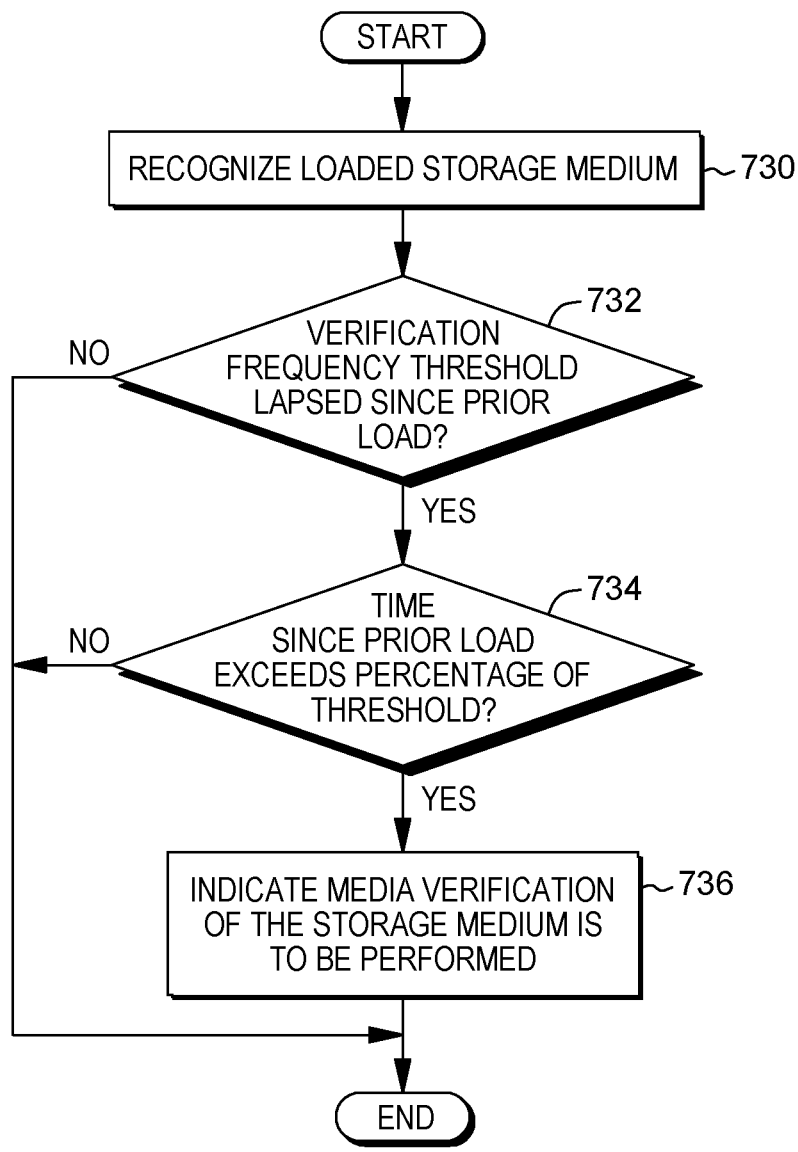

FIG. 7C depicts another example process for maintaining a storage media check database, in accordance with aspects described herein. In some examples, the process is triggered when a storage medium is loaded/mounted to a system. The process recognizes (730) that a storage medium has been loaded and then determines (732) whether the verification frequency threshold amount of time has lapsed since a prior load of the storage medium (i.e. the latest load immediately prior to the current load). If not (732, N), the process ends. Otherwise (732, Y), the process determines (734) whether a time since the prior load exceeds a percentage of the verification frequency threshold. If not (734, N), the process ends. Otherwise (734, Y) the process indicates (736) media verification of the storage medium is to be performed, and then the process ends.

Thus, physically loading a storage medium, of the plurality of storage media, for reading prior to lapse of the verification frequency threshold since a prior load of the storage medium can serve as a trigger for determining whether the time since the prior load of the storage medium exceeds a percentage of the verification frequency threshold. If so, then media verification of the storage medium is indicated to be performed.

Figure 7D:
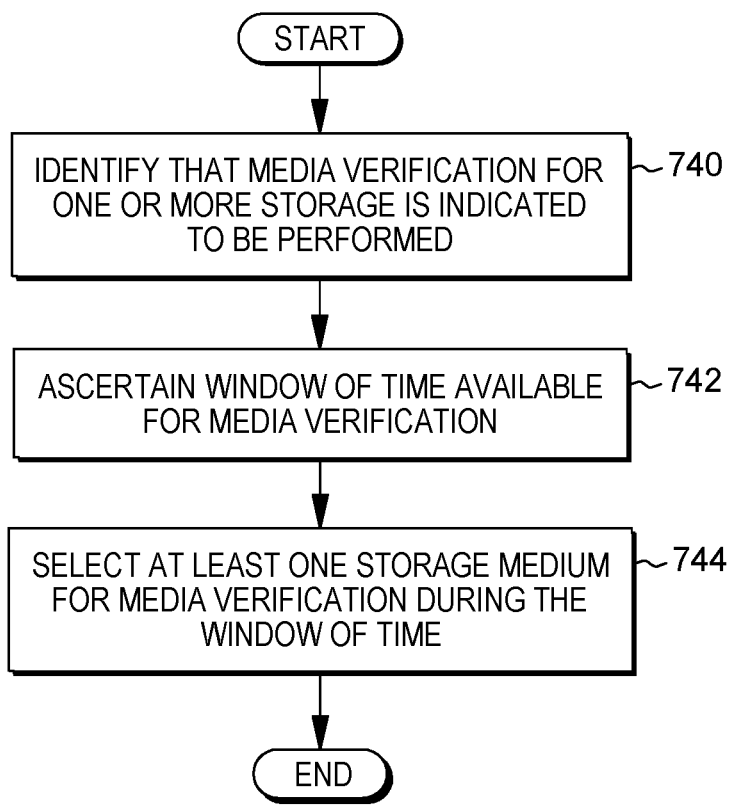

FIG. 7D depicts an example process for coordinating media verification, in accordance with aspects described herein. The process at 740 accesses the storage media check database and identifies that media verification of the one or more storage media is indicated to be performed. The process then ascertains (742) a window of time available for media verification based on statistics of drive usage of the plurality of storage media. Based on the ascertained window of time available for media verification, the process selects (744) at least one storage medium of the one or more storage media. Thus, based on the window available, at least one storage medium is selected to be verified, and at least one medium is/are the media for which it is determined that verification can fit in the window. The selection of the at least one storage medium can be based on a duration of the window of time and estimated time to perform media verification of the one or more storage media, including the at least one storage medium. In this regard, the selection can consider the length of the window of time and estimated verification times across all of the media marked for verification, and then pick which media and how many make sense to verify in that window of time.

Figure 7E:
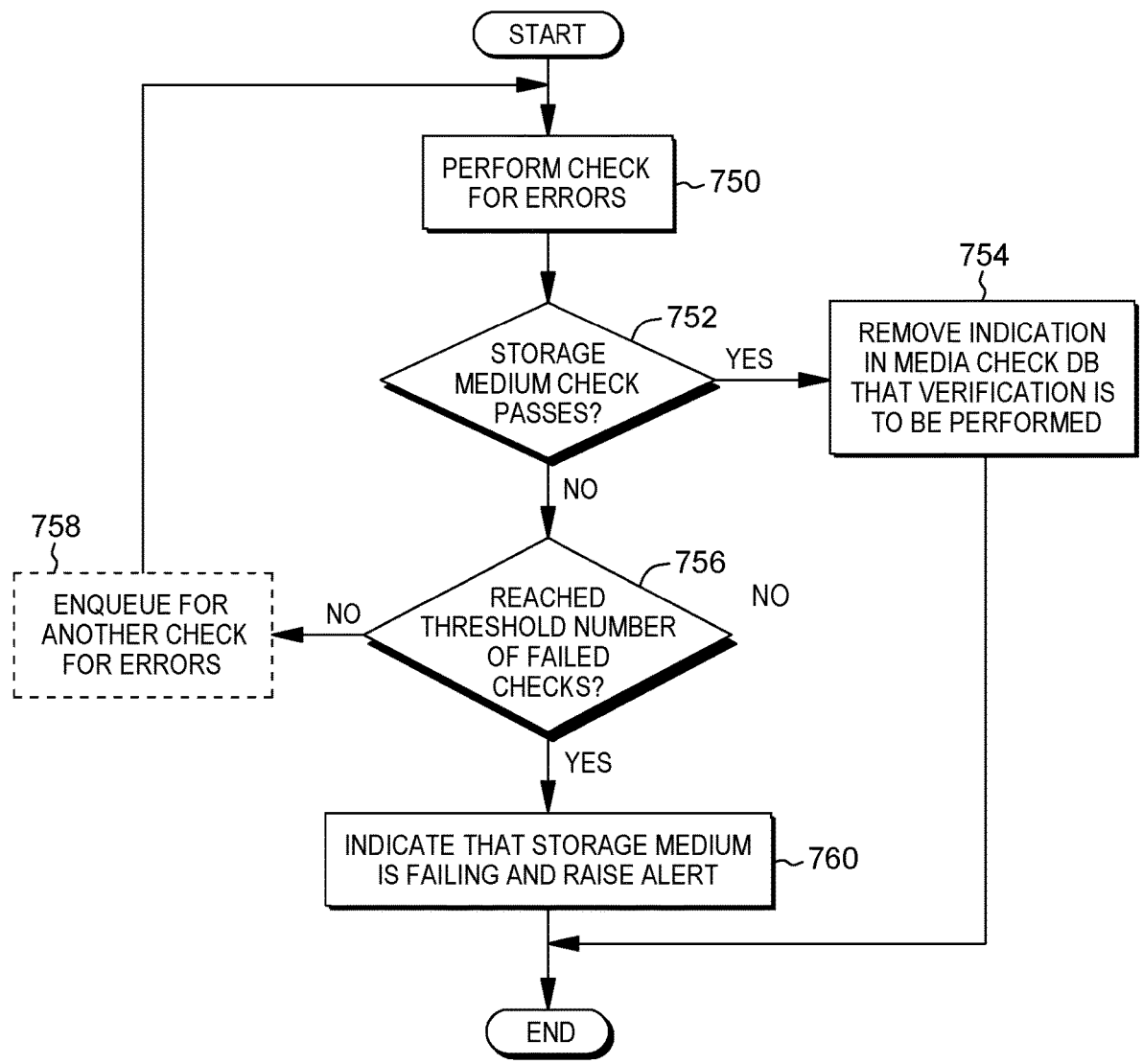

In some embodiments, the process of FIG. 7A further includes performing the media verification of one or more storage media of the at least one storage medium selected for verification in the window of time. FIG. 7E depicts an example process for performing the media verification of a storage medium, in accordance with aspects described herein. The process performs (750) a check of the storage medium for errors and determines (752) whether the storage medium passes the check. Based on the storage medium passing the check (752, Y), the process removes (754) the indication in the storage media check database that media verification of the storage medium is to be performed, and then ends. Otherwise, based on the storage medium failing the check (752, N), the process determines (756) whether a threshold number of consecutive failed checks of the storage medium has been reached as a result of failing the current check. Based on determining that the threshold number of consecutive failed checks of the storage medium has not been reached (756, N), the process optionally enqueues (758) the storage medium for another check for errors in this window of time. Otherwise, based on determining that the threshold number of consecutive failed checks of the storage medium has been reached (756, Y), the process at 760 indicates that the storage medium is failed and raises an alert.

Although various examples are provided, variations are possible without departing from a spirit of the claimed aspects.

Figure 8:
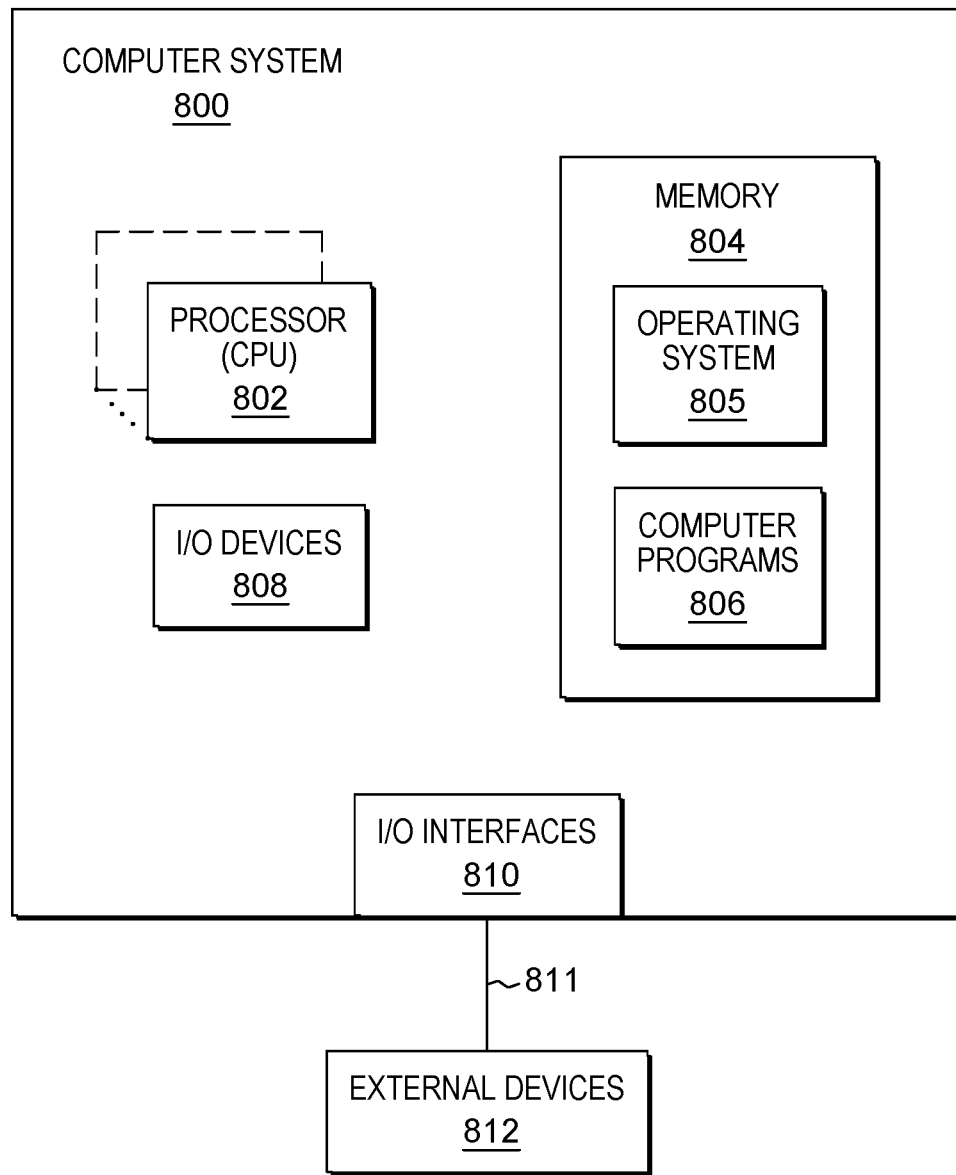
FIG. 8 depicts one example of a computer system and associated devices to incorporate and/or use aspects described herein.

Processes described herein may be performed singly or collectively by one or more computer systems, such as one or more servers as described herein. FIG. 8 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA) or Intel Corporation (Santa Clara, Calif., USA), as examples.

FIG. 8 shows a computer system 800 in communication with external device(s) 812. Computer system 800 includes one or more processor(s) 802, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 802 can also include register(s) to be used by one or more of the functional components. Computer system 800 also includes memory 804, input/output (I/O) devices 808, and I/O interfaces 810, which may be coupled to processor(s) 802 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 804 can be or include main or system memory (e.g. Random Access Memory) used in the execution of program instructions, storage device(s) such as hard drive (s), flash media, or optical media as examples, and/or cache memory, as examples. Memory 804 can include, for instance, a cache, such as a shared cache, which may be coupled to local caches (examples include L1 cache, L2 cache, etc.) of processor(s) 802. Additionally, memory 804 may be or include at least one computer program product having a set (e.g., at least one) of program modules, instructions, code or the like that is/are configured to carry out functions of embodiments described herein when executed by one or more processors.

Memory 804 can store an operating system 805 and other computer programs 806, such as one or more computer programs/applications that execute to perform aspects described herein. Specifically, programs/applications can include computer readable program instructions that may be configured to carry out functions of embodiments of aspects described herein.

Examples of I/O devices 808 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (812) coupled to the computer system through one or more I/O interfaces 810.

Computer system 800 may communicate with one or more external devices 812 via one or more I/O interfaces 810. Example external devices include a keyboard, a pointing device, a display, and/or any other devices that enable a user to interact with computer system 800. Other example external devices include any device that enables computer system 800 to communicate with one or more other computing systems or peripheral devices such as a printer. A network interface/adapter is an example I/O interface that enables computer system 800 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 810 and external devices 812 can occur across wired and/or wireless communications link(s) 811, such as Ethernet-based wired or wireless connections. Example wireless connections include cellular, Wi-Fi, Bluetooth®, proximity-based, near-field, or other types of wireless connections. More generally, communications link(s) 811 may be any appropriate wireless and/or wired communication link(s) for communicating data.

Particular external device(s) 812 may include one or more data storage devices, which may store one or more programs, one or more computer readable program instructions, and/or data, etc. Computer system 800 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 800 may be operational with numerous other general purpose or special purpose computing system environments or configurations. Computer system 800 may take any of various forms, well-known examples of which include, but are not limited to, personal computer (PC)

system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
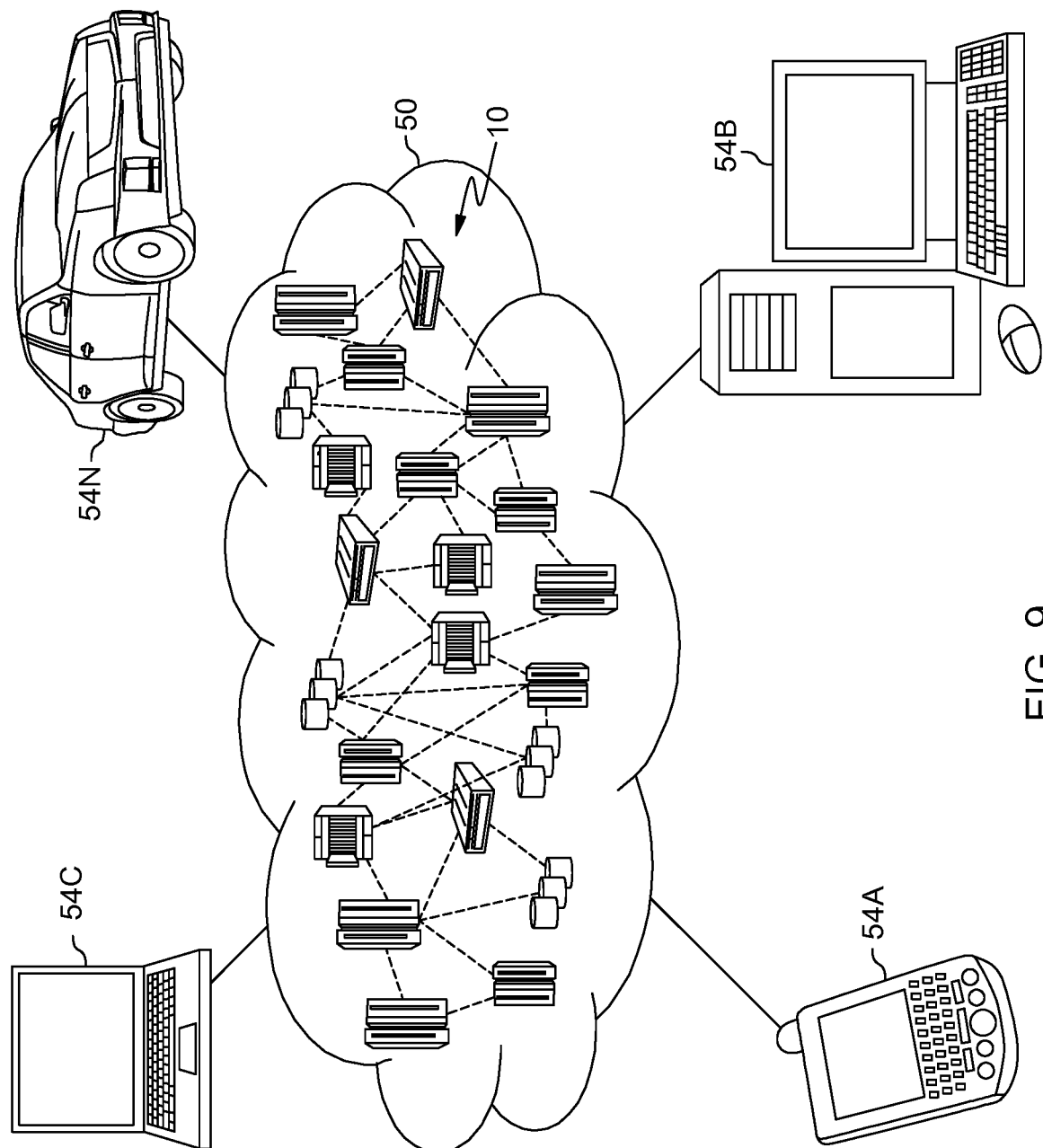
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
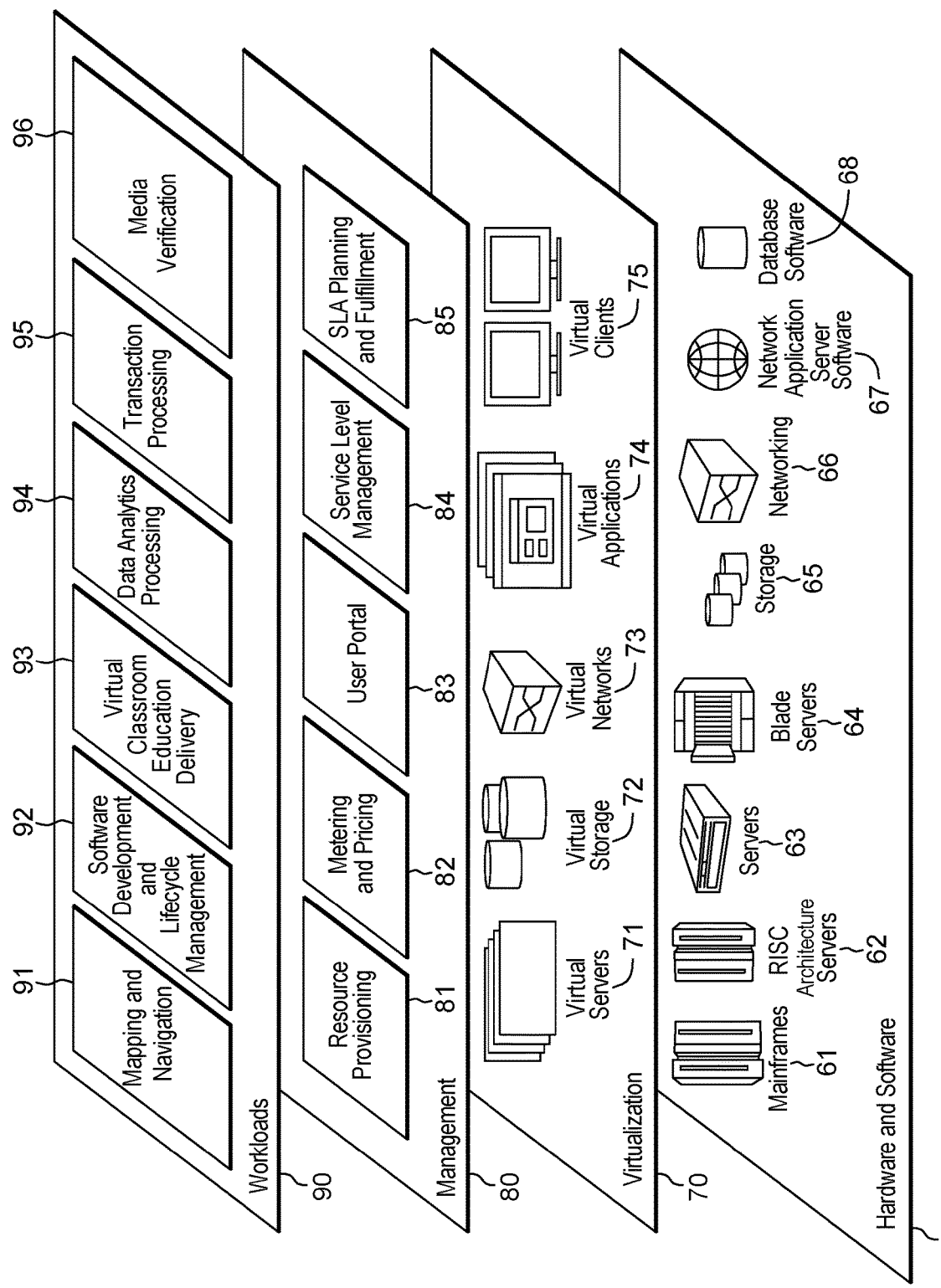
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and coordinated media verification 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   checking usage of a plurality of storage media of a computing environment;
   maintaining a storage media check database indicating media verification to be performed for one or more storage media of the plurality of storage media, wherein the maintaining comprises:
     determining a time since a last load of a selected storage medium of the plurality of storage media;
     comparing the time since the last load of the selected storage medium to a verification frequency threshold; and
     determining, based on the comparing, whether media verification of the selected storage medium is to be performed;
   coordinating media verification of at least one storage medium of the plurality of storage media based on the storage media check database, the coordinating the media verification comprising:
     accessing the storage media check database and identifying that media verification of the one or more storage media is indicated to be performed; and
     based on an ascertained window of time available for media verification, selecting at least one storage medium of the one or more storage media; and
   initiating media verification of the selected at least one storage medium.

2. The method of claim 1, wherein based on the comparing indicating that the time since the last load of the selected storage medium exceeds the verification frequency threshold, the maintaining determines and indicates in the storage media check database that media verification of the selected storage medium is to be performed.

3. The method of claim 1, wherein the maintaining further comprises:
   based on physically loading a storage medium, of the plurality of storage media, for reading prior to lapse of the verification frequency threshold since a prior load of the storage medium, determining whether the time since the prior load of the storage medium exceeds a percentage of the verification frequency threshold; and
   based on the time since the prior load exceeding the percentage of the verification frequency threshold, indicating in the storage media check database that media verification of the storage medium is to be performed.

4. The method of claim 1, wherein the coordinating the media verification of the at least one storage medium further comprises ascertaining the window of time based on statistics of drive usage of the plurality of storage media.

5. The method of claim 4, wherein the coordinating the media verification of the at least one storage medium further comprises selecting the at least one storage medium based on a duration of the window of time and estimated time to perform media verification of the one or more storage media, including the at least one storage medium.

6. The method of claim 1, further comprising performing media verification of a storage medium of the at least one storage medium, wherein the media verification of the storage medium comprises performing a check of the storage medium for errors and determining whether the storage medium passes the check.

7. The method of claim 6, wherein based on the storage medium passing the check, the media verification of the storage medium further comprises removing the indication in the storage media check database that media verification of the storage medium is to be performed.

8. The method of claim 6, wherein based on the storage medium failing the check, the media verification of the storage medium further comprises:
   determining whether a threshold number of consecutive failed checks of the storage medium has been reached as a result of failing the check; and
   based on determining that the threshold number of consecutive failed checks of the storage medium has not been reached, enqueuing the storage medium for another check for errors.

9. The method of claim 6, wherein based on the storage medium failing the check, the media verification of the storage medium further comprises:
   determining whether a threshold number of consecutive failed checks of the storage medium has been reached as a result of failing the check; and
   based on determining that the threshold number of consecutive failed checks of the storage medium has been reached, indicating that the storage medium is failed and raising an alert.

10. The method of claim 1, wherein the plurality of storage media comprise magnetic tapes, wherein the at least one storage medium comprises at least one magnetic tape and wherein the media verification of the at least one storage medium comprises verifying integrity of the at least one magnetic tape and readability of data stored thereon.

11. A computer system comprising:
   a memory; and
   a processor in communication with the memory, wherein the computer system is configured to perform a method comprising:
      checking usage of a plurality of storage media of a computing environment;
      maintaining a storage media check database indicating media verification to be performed for one or more storage media of the plurality of storage media, wherein the maintaining comprises:
         determining a time since a last load of a selected storage medium of the plurality of storage media;
         comparing the time since the last load of the selected storage medium to a verification frequency threshold; and
         determining, based on the comparing, whether media verification of the selected storage medium is to be performed;
      coordinating media verification of at least one storage medium of the plurality of storage media based on the storage media check database, the coordinating the media verification comprising:
         accessing the storage media check database and identifying that media verification of the one or more storage media is indicated to be performed; and
         based on an ascertained window of time available for media verification, selecting at least one storage medium of the one or more storage media; and
         initiating media verification of the selected at least one storage medium.

12. The computer system of claim 11, wherein the maintaining further comprises:
   based on physically loading a storage medium, of the plurality of storage media, for reading prior to lapse of the verification frequency threshold since a prior load of the storage medium, determining whether the time since the prior load of the storage medium exceeds a percentage of the verification frequency threshold; and
   based on the time since the prior load exceeding the percentage of the verification frequency threshold, indicating in the storage media check database that media verification of the storage medium is to be performed.

13. The computer system of claim 11, wherein the coordinating the media verification of the at least one storage medium further comprises ascertaining the window of time based on statistics of drive usage of the plurality of storage media, and wherein the coordinating the media verification of the at least one storage medium further comprises selecting the at least one storage medium based on a duration of the window of time and estimated time to perform media verification of the one or more storage media, including the at least one storage medium.

14. The computer system of claim 11, wherein the method further comprises performing media verification of a storage medium of the at least one storage medium, wherein the media verification of the storage medium comprises performing a check of the storage medium for errors and determining whether the storage medium passes the check, wherein based on the storage medium failing the check, the media verification of the storage medium further comprises:
   determining whether a threshold number of consecutive failed checks of the storage medium has been reached as a result of failing the check; and
   based on determining that the threshold number of consecutive failed checks of the storage medium has not been reached, enqueuing the storage medium for another check for errors.

15. The computer system of claim 11, wherein the method further comprises performing media verification of a storage medium of the at least one storage medium, wherein the media verification of the storage medium comprises performing a check of the storage medium for errors and determining whether the storage medium passes the check, wherein based on the storage medium failing the check, the media verification of the storage medium further comprises:
   determining whether a threshold number of consecutive failed checks of the storage medium has been reached as a result of failing the check; and
   based on determining that the threshold number of consecutive failed checks of the storage medium has been reached, indicating that the storage medium is failed and raising an alert.

16. A computer program product comprising:
   a computer readable storage medium readable by a processing circuit and storing instructions for execution by the processing circuit for performing a method comprising:
      checking usage of a plurality of storage media of a computing environment;
      maintaining a storage media check database indicating media verification to be performed for one or more storage media of the plurality of storage media, wherein the maintaining comprises:
    determining a time since a last load of a selected storage medium of the plurality of storage media;
    comparing the time since the last load of the selected storage medium to a verification frequency threshold; and
    determining, based on the comparing, whether media verification of the selected storage medium is to be performed;
coordinating media verification of at least one storage medium of the plurality of storage media based on the storage media check database, the coordinating the media verification comprising:
    accessing the storage media check database and identifying that media verification of the one or more storage media is indicated to be performed; and
    based on an ascertained window of time available for media verification, selecting at least one storage medium of the one or more storage media; and
    initiating media verification of the selected at least one storage medium.

17. The computer program product of claim 16, wherein the maintaining further comprises:
    based on physically loading a storage medium, of the plurality of storage media, for reading prior to lapse of the verification frequency threshold since a prior load of the storage medium, determining whether the time since the prior load of the storage medium exceeds a percentage of the verification frequency threshold; and
    based on the time since the prior load exceeding the percentage of the verification frequency threshold, indicating in the storage media check database that media verification of the storage medium is to be performed.

18. The computer program product of claim 16, wherein the coordinating the media verification of the at least one storage medium further comprises ascertaining the window of time based on statistics of drive usage of the plurality of storage media, and wherein the coordinating the media verification of the at least one storage medium further comprises selecting the at least one storage medium based on a duration of the window of time and estimated time to perform media verification of the one or more storage media, including the at least one storage medium.

19. The computer program product of claim 16, wherein the method further comprises performing media verification of a storage medium of the at least one storage medium, wherein the media verification of the storage medium comprises performing a check of the storage medium for errors and determining whether the storage medium passes the check, wherein based on the storage medium failing the check, the media verification of the storage medium further comprises:
    determining whether a threshold number of consecutive failed checks of the storage medium has been reached as a result of failing the check; and
    based on determining that the threshold number of consecutive failed checks of the storage medium has not been reached, enqueuing the storage medium for another check for errors.

20. The computer program product of claim 16, wherein the method further comprises performing media verification of a storage medium of the at least one storage medium, wherein the media verification of the storage medium comprises performing a check of the storage medium for errors and determining whether the storage medium passes the check, wherein based on the storage medium failing the check, the media verification of the storage medium further comprises:
    determining whether a threshold number of consecutive failed checks of the storage medium has been reached as a result of failing the check; and
    based on determining that the threshold number of consecutive failed checks of the storage medium has been reached, indicating that the storage medium is failed and raising an alert.

\* \* \* \* \*